United States Patent [19]
Latos

[11] 3,880,969
[45] Apr. 29, 1975

[54] METHOD OF PREPARING AN OPEN-CELLED AROMIC FOAM

[75] Inventor: Edwin J. Latos, Chicago, Ill.

[73] Assignee: Universal Oil Products Company, Des Plaines, Ill.

[22] Filed: Nov. 5, 1973

[21] Appl. No.: 412,932

[52] U.S. Cl. .............. 264/44; 106/41; 264/59; 264/63
[51] Int. Cl. ............................................. B29h 7/20
[58] Field of Search .......... 264/44, DIG. 13, 59, 63; 106/40 R, 40 V, 41

[56] References Cited
UNITED STATES PATENTS

| | | | |
|---|---|---|---|
| 2,996,389 | 8/1961 | Fernhof | 264/44 X |
| 3,288,615 | 11/1966 | Estes et al. | 264/44 X |
| 3,382,082 | 5/1968 | Eubanks et al. | 106/40 R |
| 3,470,117 | 9/1969 | Pearce | 106/40 R X |
| 3,470,276 | 9/1969 | Ohno | 264/59 X |
| 3,539,667 | 11/1970 | Nameishi | 264/59 X |
| 3,549,736 | 12/1970 | Waugh | 106/41 X |
| 3,572,417 | 3/1971 | Wismer | 264/44 X |
| 3,574,646 | 4/1971 | Wismer et al. | 264/44 X |
| 3,686,006 | 8/1972 | Horton | 264/59 UX |
| 3,770,647 | 11/1963 | Dautzenberg et al. | 264/44 X |

*Primary Examiner*—Philip E. Anderson
*Attorney, Agent, or Firm*—James R. Hoatson, Jr.; Raymond H. Nelson; William H. Page, II

[57] ABSTRACT

Ceramic foam is prepared by a method which comprises curing a thermoset resin-ceramic mixture, firing the mixture, and sintering, the improvement in said method comprising firing said mixture in a container which is enclosed on the sides and the bottom whereby an open-celled structure is produced.

4 Claims, No Drawings

3,880,969

METHOD OF PREPARING AN OPEN-CELLED AROMIC FOAM

This invention relates to a method for the preparation of ceramic foams. More specifically, this invention relates to a method for the preparation of ceramic foams which comprises curing a thermoset resin-ceramic mixture, firing the mixture, and sintering, the improvement in said method comprising firing of said mixture in a container which is enclosed on the sides and the bottom at firing conditions whereby an open-celled structure is produced and sintered at sintering conditions.

The preparation of ceramic foams from thermoset resin-ceramic mixtures is well known in the art. It has been shown that said foams may be produced by impregnating an open-celled organic sponge or a polyurethane foam with an aqueous slurry of 325-mesh silica, alumina, zirconia, zircon or mullite including a binder such as clay, sodium silicate, calcium aluminate, or mixtures thereof, squeezing out excess slurry, drying, and firing to burn out the organic sponge with or without vitrification. The firing process set forth in the prior art occurs at firing temperatures of up to 2,550°F followed by cooling to form a strong heat-resistant open-celled porous structure which may be used as a filter for molten metals. It has also been shown that lightweight ceramic products may be produced by forming clay and a compressible artificial resin filler which has a compressibility of at least that equal to the shrinkage factor of the clay during drying, said resin filler being burned during the subsequent firing procedure. A method of producing ceramic articles having very fine pores has been shown to comprise adding a powdered ceramic mass to a solution containing an ethylene oxide-fatty alcoholate condensate and a synthetic resin or resin mixtures, foaming the obtained mass, filling it into molds, and curing it by varying the pH and the temperature. Another method known to the art for the production of rigid-like strong structures which would be suitable for heat exchangers, catalyts, catalytic supports is shown by the admixture of refractory materials, as exemplified by alumina and a powdered catalyst as exemplified by zinc oxide, which is plasticized with a resin or other polymer in a solvent and, if desired, a wetting agent, and fabricated to films, assembled with suitable binders at contact points, dried and fired at temperatures of about 1,550°–1,660°C.

In contradistinction to the prior art, it has now been found that an open-celled ceramic foam structure may be prepared by a method which comprises curing a thermoset resin-ceramic mixture, firing the mixture, and sintering, the improvement in said method comprising the firing of said mixture in a container which is enclosed on the sides and the bottom at firing conditions. The utilization of the hereinbefore set forth invention will allow an opportunity for the manufacturer of ceramic foams to produce a large quantity of open-celled structures by utilization of a batch or a continuous operation. Said open-celled structures will have more utility as a catalyst as a result of the increased availability of more surface area for the impregnation of promotors, inhibitors, complementary catalysts, etc. The production of the open-celled structure will also give an advantage to the ceramic foams as a better support for catalysts in reactions which occur during rapid changes in temperatures and pressures as a result of the availability of more total surface-area impregnation of said support as compared to surface area impregnation. The method of the present invention will also give a more viable method of production of the open-celled ceramic foam structures as a result of the avoidance of a pressurized enclosure or container, said present invention will allow off-gases generated from the thermal degradation and combustion of the thermoset resin-ceramic mixture to escape through the open-ended top of the container.

The desired products of the process of this invention, namely, ceramic foams, are utilized in the chemical industry in many ways. For example, a ceramic foam may be used as a catalyst, as a support for a catalyst, as a support for an impregnated catalyst, or more specifically as a support for a catalyst in a post-internal combustion engine system, as a catalyst or catalytic support in chemical reactions which require high temperatures and pressures or the use as functional material to withstand rapid changes in temperatures and pressures and also resist corrosion and abrasions.

It is therefore an object of this invention to provide a method for the preparation of ceramic foams.

A further object of this invention is to provide a method for the preparation of ceramic foams utilizing a certain open-ended container which will permit an open-celled structure of the ceramic foams.

In one aspect an embodiment of this invention resides in a method for the preparation of ceramic foams which comprises curing a thermoset resin-ceramic mixture, firing the mixture, and sintering, the improvement in said method comprising firing of said mixture in a container which is enclosed on all sides and the bottom at firing conditions whereby an open-celled structure is produced and sintered at sintering conditions, and recovering the resultant ceramic foam.

A specific method of this invention resides in a method for preparing an open-celled structure which comprises curing a thermoset resin-ceramic mixture comprising a polyester resin and a mixture of alumina, silica and talc, firing the mixture in a container which is enclosed on the sides and the bottom at firing conditions which include a temperature in the range of from about 1,000°C to about 1,500°C and sintering at sintering conditions which would include a temperature of about 1,350°C to about 1,450°C and recovering the resultant ceramic foam commonly nomenclated as cordierite.

Another specific embodiment of this invention resides in a method for preparing an open-celled ceramic foam structure which comprises curing a thermoset resin-ceramic mixture comprising a polyester resin and a mixture of alumina, silica and magnesia, firing the reaction mixture at a temperature of 1,250°C and sintering at a temperature of 1,350°C in a container which is enclosed on the sides and the bottom and recovering the resultant ceramic foam, commonly nomenclated as cordierite.

Other objects and embodiments will be found in the following further detailed description of the present invention.

As hereinbefore set forth, the present invention is concerned with a method for preparing open-celled ceramic foam structures which comprises the curing of a thermoset resin-ceramic mixture, firing the mixture, and sintering, the improvement in said method comprising the firing of said mixture in a container which is enclosed on the sides and the bottom at reaction conditions whereby an open-celled structure is produced. The open-celled ceramic foam structure is fired in a container which is enclosed on all sides and the bottom while remaining open at the top. The firing in the container will be effected at firing conditions which would include a temperature of about 1,000°C to about 1,500°C and the resultant open-celled structure may then be sintered within the container which is enclosed on the sides and the bottom but not at the top, at sintering conditions which would include a temperature of about 1,350°C to about 1,450°C. The result of the open top container during firing will be that the gases generated from the thermal degradation and combustion of the thermoset resin-ceramic mixture will rise through the mixture and create the open-celled structure, said gases may be vented into a separate atmosphere when a batch process is utilized or into a stream comprising off-gases when a continuous method is utilized. Another variable which is employed in the production of the open-celled ceramic foam structure is the amount of thermoset resin and ceramic mixture which may be added to comprise the total mixture. The proportion of the mixture as contemplated in the hereinbefore set forth method will be any mixture which is known to the art such as two to four parts of thermoset resin per part of ceramic mixture present.

Examples of suitable thermoset resin-ceramic mixtures which are utilized as the starting materials in the method of this invention include, in particular, polyester and alumina, silica and talc; thermoplastic resins, phenolic thermoplastic resin and alumina, silica and talc; epoxy thermoplastic resin and alumina, silica and talc; polyurethane and alumina, silica and talc; cellulose and alumina, silica and talc; polyester and alumina, silica and magnesia; phenolic thermoplastic resin and alumina, silica and magnesia; epoxy thermoplastic resin and alumina, silica and magnesia; polyurethane and alumina, silica and magnesia; cellulose and alumina, silica and magnesia; alkyl thermoplastic resin and alumina, silica and magnesia; or any combinations thereof.

The catalytic compositions of matter which may be used in the method of this invention will comprise any catalyst known to the art of ceramic foam preparation such as zinc oxide, chromium oxide, platinum or vanadium pentoxide. It is also contemplated within the scope of this invention that the container which is enclosed on the sides and the bottom during firing and sintering may comprise either a ceramic mold such as a silica or alumina mold, or a metallic mold. It is understood that the aforementioned thermoset resin-ceramic mixtures, catalysts and molds are only representative of the class of compounds which may be employed in the method of this invention and that the invention is not necessarily limited thereto.

It is contemplated within the method of this invention that the production of the open-celled ceramic foam structures may be prepared in either a batch or a continuous type of operation. For example, when a batch type operation is employed, the cured thermoset resin-ceramic mixture may be placed in any suitable ceramic or metallic mold which may also contain an appropriate catalyst. The cured thermoset resin-ceramic mixture may be fired in the container which is enclosed on the sides and the bottom in any suitable batch type kiln which would include a scove kiln, clamp kiln or rectangular up-draft kiln, for a period of time comprising between 0.2 hours and 20 hours or more in duration. After removal from the batch type kiln the resultant open-celled ceramic foam structure may be recovered by the physical removal from the ceramic or metallic mold. The recovered open-celled ceramic foam structure may subsequently be subjected to analyses which will determine its physical properties such as physical strength, tensile strength, heat resistance, etc.

It is also contemplated within the scope of this invention that the method for obtaining the open-celled ceramic foam structure may be effected in a continuous manner of operation. When such a type of operation is employed, the cured thermoset resin-ceramic mixture situated in a ceramic or metallic mold which is enclosed on the sides and the bottom is continuously charged to a continuous kiln, such as a moving fire-zone, fixed fire-zone or a car tunnel type of continuous kiln. After completion of the desired residence time sufficient to fire and sinter the contents of the molds, the open-celled ceramic foam structure is continuously separated from the ceramic or metallic mold and removed from the kiln whereby it may be subjected to analyses to determine its various physical characteristics. It is also contemplated within the scope of the continuous process that any catalyst known to the art may be utilized although not necessarily critical to the formation of the open-celled ceramic foam structure.

Examples of resultant open-celled ceramic foam structures which may be prepared according to the method of this invention would include cordierite, gamma-alumina, mullite, spodumene, silica, etc. It is to be further understood that the aforementioned open-celled ceramic foam structures are only representative of the class of compounds which may be prepared and that the present invention is not necessarily limited thereto.

The following examples are given to illustrate the process of the present invention which, however, are not intended to limit the generally broad scope of the present invention in strict accordance therewith.

EXAMPLE I

In this example a thermoset resin-ceramic mixture is prepared and cured by the addition of 4 parts of polyester resin per 1 part of an alumina, silica and talc mixture. The cured mixture is subsequently placed into a ceramic mold of silica and placed in a kiln, said mold possessing the physical structure of being enclosed on all sides and at the bottom but not the top thereof. The mold containing the cured thermoset resin-ceramic mixture is then fired at a temperature of 1,100°C for a period of time comprising 1 hour and subsequently sintered at a temperature of 1,400°C for a period of time comprising ½ hour. At the end of this aforementioned ½ hour period, heating is discontinued and the mold is allowed to return to room temperature after removal from the kiln. The structure is then removed from the ceramic mold which is enclosed on all sides and the bottom, and will be observed to have the physical characteristics of being an open-celled structure commonly nomenclated as cordierite.

EXAMPLE II

In this example a thermoset resin-ceramic mixture is prepared and cured by mixing 3 parts of polyester resin per 1 part of a mixture of alumina, silica and magnesia in a ceramic mold of alumina, said ceramic mold being enclosed on all sides and at the bottom but not the top thereof. A catalyst comprising vanadium pentoxide is added to the cured thermoset resin-ceramic mixture within the ceramic mold. The mold is subsequently placed in a kiln and fired at a temperature of 1,250°C for a period of time comprising 2 hours and subsequently sintered at a temperature of 1,350°C for a period of time comprising 1½ hours. At the end of the aforementioned 1½ hour period, heating is discontinued and the mold allowed to return to room temperature after removal from the kiln. The ceramic foam is removed from the ceramic alumina mold and observed to be an open-celled ceramic foam commonly nomenclated as cordierite.

EXAMPLE III

In this example a thermoset resin-ceramic mixture is prepared and cured by adding 2 parts of polyester resin per part of a mixture of of alumina, silica and talc, to a metallic mold of titanium, said metallic mold being enclosed on all sides and the bottom but not the top thereof. Zinc oxide is added to function as a catalyst. The metallic mold is placed in a kiln and is subsequently fired at a temperature of 1,400°C for a period of time comprising 1 hour and subsequently sintered at a temperature of 1,375°C for a period of time comprising ½ hour. At the end of the aforementioned ½ hour period, heating is discontinued and the metallic mold is allowed to return to room temperature after removal from the kiln. The structure is subsequently removed from the metallic mold and observed to be an open-celled ceramic foam structure commonly nomenclated as cordierite.

I claim as my invention:

1. A process for preparing a ceramic foam which comprises firing a cured thermoset resin-ceramic mixture at a temperature of from about 1,000°C. to about 1,500°C. in a container which is open at the top and enclosed on all sides and the bottom, allowing the gases generated from the thermal degradation and combustion of said mixture to rise through the mixture and escape through the open-ended top of the container, thereby creating an open-celled structure, sintering the thus fired resin-ceramic mixture is a temperature of from about 1,350°C. to about 1,450°C., and recovering the resultant ceramic foam.

2. The process of claim 1 further characterized in that the resultant ceramic foam is a cordierite.

3. The process of claim 1 further characterized in that the thermoset resin-ceramic mixture comprises a polyester resin and a mixture of alumina, silica and talc.

4. The process of claim 1 further characterized in that the thermoset resin-ceramic mixture comprises a polyester resin and a mixture of alumina, silica and magnesia.

* * * * *